ated Patent [19]

Strassel

[11] 4,215,177
[45] Jul. 29, 1980

[54] PROCESS FOR TREATING POLYVINYL FLUORIDE AND LAMINATES PREPARED THEREFROM

[75] Inventor: Albert Strassel, Oullins, France

[73] Assignee: Produits Chimiques Ugine Kuhlmann, Paris, France

[21] Appl. No.: 872,254

[22] Filed: Jan. 25, 1978

[30] Foreign Application Priority Data

Mar. 4, 1977 [FR] France ................................ 77 06392

[51] Int. Cl.$^2$ ...................... B32B 27/38; B32B 27/40
[52] U.S. Cl. .................................. 428/413; 427/208.4;
427/208.8; 427/393.5; 427/385.5; 427/412.4;
427/430.1; 138/146; 138/177; 138/DIG. 3;
138/DIG. 7; 156/327; 156/331; 427/386;
427/387; 427/421; 427/428; 427/429; 428/423;
428/424.6
[58] Field of Search ............... 427/385 R, 385 B, 386,
427/387, 207 B, 207 D, , 407 F, 427, 428, 429,
430; 428/424, 421, 413; 138/145, 146, 177,
DIG. 3, DIG. 7, 137; 156/331, 332, 327

[56] References Cited

U.S. PATENT DOCUMENTS

| 3,900,616 | 8/1975 | Moore | 427/385 R |
| 3,931,836 | 1/1976 | Thiel | 138/145 X |
| 3,944,689 | 3/1976 | Luckock et al. | 427/385 R |
| 3,959,526 | 5/1976 | Swerlick | 427/385 B X |
| 4,066,814 | 1/1978 | Chiklis | 427/385 B X |

Primary Examiner—Ronald H. Smith
Assistant Examiner—Thurman K. Page
Attorney, Agent, or Firm—Pennie & Edmonds

[57] ABSTRACT

The present invention provides a process for treating polyvinyl fluoride surfaces to enhance adhesion of other polymers thereto comprising applying to at least one surface thereof a solution consisting essentially of a coating polymer selected from a polyurethane or an alkyl polymethacrylate and at least one aprotic polar solvent in which said polymer is soluble, and exposing said surface to a temperature of from about 120° C. to 230° C. for a time sufficient to evaporate said solvent. The treated polyvinyl fluoride having an adhering intermediary surface of polyurethane or alkyl polymethacrylate usefully serves as a means to secure the polyvinyl fluoride to another polymer which otherwise would not adhere to polyvinyl.

9 Claims, No Drawings

PROCESS FOR TREATING POLYVINYL FLUORIDE AND LAMINATES PREPARED THEREFROM

BACKGROUND OF THE INVENTION

The adhesion of polyvinyl fluoride (hereinafter PVF) to other polymers is generally minimal or nonexistent. This enables PVF to be used as an unmolding surface since it provides a stripping surface for certain resins even at very high temperatures.

Thus, to effect adhesion of other polymers to a surface of PVF, it is necessary to use expensive and extensive treatments of the PVF surface which treatments are, therefore, not commercially satisfactory.

SUMMARY OF THE INVENTION

According to the present invention, it has been found that polymers can be made to adhere satisfactorily to PVF by a simple and inexpensive treatment of PVF surfaces.

Briefly stated, the present invention comprises a process for treatment of polyvinyl fluoride surfaces to enhance adhesion of other polymers thereto comprising applying a solution to at least one surface thereof, said solution consisting essentially of a coating polymer selected from a polyurethane or an alkyl polymethacrylate and at least one aprotic solvent in which said polymer is soluble, and exposing said surface to a temperature of from about 120° C. to 230° C. for a time sufficient to evaporate said solvent. The invention also comprises the further step of adhering to said treated surfaces other polymers and the resultant products.

DETAILED DESCRIPTION

Although polyurethanes and alkyl polymethacrylates generally do not adhere to PVF, it has been found that after application to the PVF of a polyurethane or alkyl polymethacrylate solution in an aprotic polar solvent and evaporation of the solvent, these polymers adhere to PVF.

The category of aprotic polar solvents is known. These solvents are described and illustrated by A. J. Parker in *Quarterly Reviews* (1962) 16, pages 163–187. The following materials illustrate useful examples of aprotic polar solvents: dimethylformamide, dimethylacetamide, tetrahydrofurane, dimethylsulfoxide, cyclohexanone, hexamethylphosphoramide, tetramethylurea or solvents of the same family. These solvents are known as hot solvents of PVF.

Any type of polyurethane may be deposited on the PVF surface as long as it is soluble in aprotic polar solvents or mixtures thereof. However, it is an advantage to select linear polyurethanes or slightly reticulated polyurethanes such as those derived from the well-known reaction of a polyether polyol and/or polyester with a polyisocyanate, generally in the presence of a catalyst, or even polyurethanes comprising urea groups in the chain derived from the equally known reaction of a polyether polyol and/or polyester on a polyisocyanate in excess in the presence of a polyamine, an amino alcohol and/or water.

It is also possible to use polyurethanes or polyurethane polyureas obtained either from mixtures of polyether polyols and/or polyesters or their copolymers or even polyols comprising grafts such as acrylonitrile, a-acrylonitrile styrene, methyl styrene, vinyl chloride, vinylidene chloride or methyl methacrylate.

Linear polyurethanes or polyurethane polyureas derived from difunctional compounds, such as diols, diisocyanates and diamines and/or amino alcohols and/or water and polyurethanes or polyurethane polyureas obtained by reacting an excess of hydroxyl functions relative to isocyanate functions so as to produce free associations favorable to adhesion irrespective of whether the polyurethanes are of the polyether or polyester type or both at the same time are preferably used.

The alkyl polymethacrylates are preferably $C_1$ or $C_2$ alkyl methacrylates with poly(methyl methacrylate) or a copolymer containing at least 85% by weight poly(methyl methacrylate) preferably used as the alkyl polymethacrylate.

The polyurethane or alkyl polymethacrylate is placed in solution in the aprotic polar solvent or solvents in a concentration of 1–50% by weight. Non-polar aprotic solvents such as ketones, esters, aromatic or aliphatic solvents can also be added in minor amounts to ultimately reduce the viscosity of the solution.

The solution is prepared by dissolving polyurethane or alkyl polymethacrylate in an aprotic polar solvent or a mixture of solvents containing at least one aprotic polar solvent. The polyurethane solution can also be prepared by producing polyurethane in situ by causing its constituents to react under known conditions in an aprotic polar solvent or a mixture of solvents containing at least one aprotic polar solvent.

The polyurethane or alkyl polymethacrylate solution is applied to the PVF under ambient conditions and by conventional means; for example, by means of a roller, scraper, brush, by spraying, soaking, and the like. The PVF is then heated at a temperature of 120° C. to 230° C. for sufficient time to evaporate the solvent. This time period, which depends on the thickness of the polyurethane solution coating layer is generally in the order of a few minutes and, in most cases, a period of 1 to 10 minutes is sufficient. In the painting and varnishing trade the time required to evaporate the solvent is determined by the touch test; when a finger is applied, no mark should be left on the treated surface, and this test can be used as a standard to determine the necessary drying time for the instant process.

A polyurethane or alkyl polymethacrylate, which subsequently serves as an intermediary for making an exterior polymer adhere to the PVF, is attached to the PVF surface after it has been treated in the above manner. Accordingly, the polymers which can be made to adhere to the PVF are preferably those which adhere to the polyurethane or alkyl polymethacrylate without any intermediary. Such polymers which are useful are exemplified by: polyesters, epoxides, silicons, polysulfides, phenolics, chlorinated rubbers, polyvinyls, polyurethanes, polyacrylics and copolymers thereof such as acrylonitrile-butadiene-styrene or acrylonitrile-butadiene resins.

These exterior polymers can be made to adhere to the PVF by different known means, as, for example, by applying on the treated surface either components which produce the polymer by reaction in situ or polymerizable resins or even by thermal gluing or bonding of the polymer to the treated surface.

The PVF surfaces which have been treated by the process according to the invention can also be subjected to a variety of different treatments which are generally carried out on a polyurethane surface such as painting, metalizing, and the like.

The process according to the invention is applicable to any type of PVF material such as sheets, panels, webs, tubes, any compression or injection molded article or even heat molded articles thereof.

The invention will be further described in the examples that follow which are set forth for purposes of illustration only, and wherein all parts are by weight unless otherwise indicated.

EXAMPLE 1

A 1 mm. thick PVF sheet is coated at 20° C. by means of a brush with a dimethylformamide solution containing 20% by weight dry extract of a linear polyurethane polymer derived from the reaction of polyethyleneglycol adipate (molecular weight 2,000), diphenylmethane diisocyanate, and water.

The reaction takes place under nitrogen for 5 hours at 90° C. in the total quantity of dimethylformamide until the free isocyanate functions have disappeared; the relation (OH polyol+OH water)/NCO is 1.

The sheet which has been coated in this manner is placed in an oven at 140° C. for 3 minutes.

A polyester-glass stratification process is carried out on the cooled treated surface; the polyester consisting of an orthophthalic unsaturated polyester resin containing methyl methacrylate (UKAPON T 215 MRL, Produits Chimiques Ugine Kuhlmann).

Upon hardening of the polyester, excellent adhesion of the stratified layer to the PVF was noted.

EXAMPLE 2

A solution containing 15% by weight solid polyester-polyurethane (DESMOCOLLE 500, Farbenfabriken Bayer) in dimethylacetamide is prepared at room temperature.

This solution is sprayed on a PVF film, 400μ thick. This web is allowed to stand for 5 minutes at 150° C. in a ventilated oven.

One week later, the epoxide components necessary to form an epoxy resin (Araldite AV 138 and its adjuvants, by Ciba) are poured onto the treated surface of the film. Perfect adhesion between the different polymers is noted after polymerization of the epoxide.

EXAMPLE 3

A solution containing 20% by weight of the same linear polyurethane as used in Example 1 in dimethylacetamide is applied by brush to a PVF film having a thickness of 200μ. After evaporating the solvent at 170° C. for 2 minutes, the treated PVF is stored.

Three days later this web is heat bonded by high frequency to a 5/10 mm. thermoplastic polyurethane sheet. Excellent adhesion is obtained between the different polymers.

By comparison, it was found that there was no adhesion between the same untreated PVF web and the 5/10 mm. thermoplastic polyurethane sheet when heat bonded by high frequency.

EXAMPLE 4

The viscosity of a solution of linear polyurethane as used in Example 1, but obtained from polyoxypropyleneglycol having a molecular weight of 2,000 instead of polyethyleneglycol adipate, is lowered by adding 15% by weight methylethyl ketone.

This solution is sprayed on a PVF film having a thickness of 25μ and the solvents are evaporated at 140° C. in a ventilated oven over a period of 3 minutes.

After cooling, the web is rolled and stored at room temperature.

Three weeks later the film is unrolled and a chlorinated polyester diol resin (UKADIOL 74,300, Produits Chimiques Ugine Kuhlmann) is poured onto the treated surface. Polyester-glass stratification is carried out by conventional methods. Polyester panels coated with a PVF protective adhesive layer are thereby produced.

EXAMPLES 5 and 6

Dimethylformamide solutions containing 10 and 40% by weight dry extract of polyurethane polyurea are prepared by reacting a mixture containing the constituents listed hereafter in dimethylformamide at 75° C. for 3 hours:

1,000 g. of a 1/1 by weight mixture of polyoxypropylene glycol, molecular weight 2,000; polyethyleneglycol adipate, molecular weight 2,000; 20 g. butanediol; 4 g. water; and toluene diisocyanate such that the relation reagent NCO/OH=0.95.

The cooled solutions are thereafter used as in Example 1.

EXAMPLE 7

After treating a PVF sheet having a thickness of 1 mm. as described with a liquid polyurethane as set forth in Example 4, it is placed at the bottom of a mold for molding rigid polyurethane foams. Components A and B, below, are mixed at room temperature and poured into the mold. Panels consisting of rigid polyurethane foams coated with adhering, weather-resistant PVF are thereby obtained.

|  |  | PARTS BY WEIGHT |
|---|---|---|
| COMPONENT A | | |
| Polyoxypropyleneglycolhexol, molecular weight 700 | PLURACOL 3540 (Produits Chimiques Ugine Kuhlmann) | 50 |
| Polyoxypropyleneglycoltriol, molecular weight 400 | PLURACOL 3130 (Produits Chimiques Ugine Kuhlmann) | 50 |
| Dimethylamine | | 2 |
| Triethylenediamine | | 0.4 |
| Siliconated Adjuvant | D 1903 (Goldschmidt) | 0.5 |
| Trichlorofluoromethane | FORANE 11 (Produits Chimiques Ugine Kuhlmann) | 10 |
| COMPONENT B | | |
| Diphenylmethane diisocyante (crude) | LILENE M 20 (Produits Chimiques Ugine Kuhlmann) | In a sufficient quantity for the reticulation index to be 105 (7.4 g. NCO/kg.) |

EXAMPLE 8

A solution containing 20% by weight dry extract of a linear polyurethane polymer derived from the reaction of polyethyleneglycol adipate, molecular weight 2,000, diphenylmethanediisocyanate and water in dimethylformamide is applied by brush at room temperature to a PVF film having a thickness of 100 microns and prepared by blowing extrusion.

The reaction is carried out under nitrogen for 5 hours at 90° C. in the total quantity of dimethylformamide until the free isocyanate functions have disappeared; the relation (OH polyol+OH water)/NCO is 1.

The film coated in the solution is placed in an oven at 120° C. for 4 minutes. The film is then rolled with a paper comprising a silicone coated face which acts as the anti-adhering intermediary. After a storage period of three months, the film is unrolled and is passed between calender rollers heated to 130° C. A 2 mm. thick sheet of acrylonitrile-butadiene-styrene copolymer is simultaneously calendered between these rollers; the treated face of the PVF being disposed in contact with the copolymer sheet. After cooling, a copolymer sheet coated with a PVF web having excellent adhesive properties is obtained.

EXAMPLE 9

15 g. of a polymethylmethacrylate having a molecular weight of approximately 120,000 are dissolved in 85 g. dimethylformamide. This solution is applied to a 0.1 mm. thick PVF film by means of a brush. The solvent is evaporated by allowing the PVF panel to remain in a ventilated oven at 150° C. for 5 minutes.

A polyester-glass stratification process is carried out by conventional methods on the surface of the treated cooled PVF panel. The polyester is an orthophthalic unsaturated polyester resin containing methylmethacrylate (UKAPON T 215 MRL, Produits Chimiques Ugine Kuhlmann).

Upon hardening of the polyester, excellent adhesion of the stratified layer to the PVF is noted.

EXAMPLE 10

50 g. ethyl acetate are added to 100 g. of the solution according to Example 9. This new solution is applied by means of a coating machine equipped with scraper to a 50µ thick PVF film. The film is allowed to remain for 3 minutes in an oven at a temperature of 165° C.

A 2 mm. thick panel of acrylonitrile-butadiene-styrene copolymer is made to adhere to the treated surface of the PVF film by a thermal bonding operation. The thermal bonding operation consists in applying the treated face of the PVF on the copolymer panel and passing the two together between the cylinders of a calender heated to 130° C. Perfect adhesion of the PVF to the copolymer is obtained.

EXAMPLE 11

The procedure of Example 10 is repeated but a plate, 2 mm. thick, of polymethyl methacrylate is made to adhere to the PVF film by plaxage.

EXAMPLE 12

The tests of this example demonstrate the relationship existing between the evaporation temperature of the solvent and the influence of the aprotic polar solvent used in the solution. The polyurethane used in these tests consisted of a polymer prepared by the reaction in toto of a mixture of 100 parts by weight butanediol polyadipate (molecular weight 2,000) and 3 parts by weight butanediol which had been dehydrated in advance at 70° C. with fused diphenylmethane diisocyanate at 50° C. in an NCO/OH ratio of 1. After stirring the reagents for 5 minutes, the liquid mixture is poured into a mold and baked at 140° C. for 14 hours.

(a) A polyurethane solution containing 20% by weight dry extract in dimethylformamide coated on a PVF sheet having 1 mm. thickness leaves on its surface after 5 days at 20° C. a polyurethane layer which does not adhere to PVF.

(b) The same polyurethane in solution in acetone containing 20% by weight dry extract does not adhere to PVF after the solvent is evaporated at a temperature in excess of 120° C.

(c) The preceding tests are repeated with the polyurethane in solution in the dimethylformamide and the solvent is removed at 140° C. Excellent adhesion between the polyurethane and the PVF is obtained.

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A process for treating polyvinyl fluoride surfaces to enhance adhesion of other polymers thereto comprising applying to at least one surface thereof a solution consisting essentially of a thermoplastic coating polymer selected from a polyurethane or an alkyl polymethacrylate and at least one aprotic polar solvent in which said polymer is soluble, and exposing said surface to a temperature of from about 120° C. to 230° C. for a time sufficient to evaporate said solvent.

2. The process of claim 1 wherein the solution contains from 1 to 50% by weight of said polymer.

3. The process of claim 1 wherein said alkyl polymethacrylate is poly(methyl methacrylate) or poly(ethyl methacrylate).

4. The process of claim 1 wherein the aprotic polar solvent is selected from dimethyl formamide, dimethylacetamide, tetrahydrofurane, dimethylsulfoxide, cyclohexanone, hexamethylphosphoramide, tetramethylurea, or mixtures thereof.

5. The process of claim 1 including adhering to said surface, after evaporation of said solvent, an exterior polymer which will adhere to said coating polymer without need for an intermediate coating.

6. The process of claim 5 wherein said exterior polymer is selected from polyesters, epoxides, silicons, polysulfides, chlorinated rubbers, phenolics, polyvinyls, polyurethanes, polyacrylics, or copolymers thereof.

7. The process of claim 1 wherein polyvinyl fluoride is adhered to a third polymer by means of the fixed polyurethane or alkyl polymethacrylate.

8. The product of the process of claim 1.

9. The product of the process of claim 7.

* * * * *

UNITED STATES PATENT AND TRADEMARK OFFICE
CERTIFICATE OF CORRECTION

PATENT NO. : 4,215,177
DATED : July 29, 1980
INVENTOR(S) : Albert Strassel

It is certified that error appears in the above-identified patent and that said Letters Patent are hereby corrected as shown below:

Column 2, line 1, reads "a-acrylonitrile", should read
--acrylonitrile--

Column 2, line 1, reads "methyl styrene", should read
--α-methylstyrene--

Column 4, line 55, reads "diisocyante", should read
--diisocyanate--

Signed and Sealed this

Twenty-third Day of December 1980

[SEAL]

*Attest:*

SIDNEY A. DIAMOND

*Attesting Officer*    *Commissioner of Patents and Trademarks*